US010929687B2

(12) United States Patent
Anderson et al.

(10) Patent No.: US 10,929,687 B2
(45) Date of Patent: Feb. 23, 2021

(54) AUTHENTICATION BY NAVIGATION-CORRELATED SENSING

(71) Applicant: Intel Corporation, Santa Clara, CA (US)

(72) Inventors: Glen J. Anderson, Beaverton, OR (US); Carl S. Marshall, Portland, OR (US); Oleg Pogorelik, Lapid (IL)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 16/236,437

(22) Filed: Dec. 29, 2018

(65) Prior Publication Data
US 2019/0138819 A1 May 9, 2019

(51) Int. Cl.
*G06K 9/00* (2006.01)
*G08G 1/00* (2006.01)
*G06K 9/62* (2006.01)
*H04W 12/02* (2009.01)
*H04W 12/06* (2009.01)
*H04W 4/44* (2018.01)
(Continued)

(52) U.S. Cl.
CPC ..... *G06K 9/00771* (2013.01); *G06K 9/00718* (2013.01); *G06K 9/00791* (2013.01); *G06K 9/6202* (2013.01); *G08G 1/20* (2013.01); *H04W 4/44* (2018.02); *H04W 12/02* (2013.01); *H04W 12/06* (2013.01); *H04W 12/12* (2013.01); *H04W 12/0017* (2019.01)

(58) Field of Classification Search
CPC ..... H04W 12/02; H04W 12/06; H04W 12/12; H04W 12/0017; G06K 9/00791; G06K 9/6202; G06K 9/00771; G06K 9/00718; G08G 1/20; G08G 1/017; G08G 1/202
See application file for complete search history.

(56) References Cited

U.S. PATENT DOCUMENTS

| 9,875,589 | B1 | 1/2018 | Buttolo et al. |
| 2010/0211440 | A1 | 8/2010 | Leshem et al. |
| 2016/0082926 | A1 | 3/2016 | Mouser et al. |

(Continued)

OTHER PUBLICATIONS

Jones, Michael, "Spoofing in the Black Sea: What really happened?", [Online]. Retrieved from the Internet: URL: https: www.gpsworld.com spoofing-in-the-black-sea-what-really-happened accessed on May 10, 2019, (Oct. 11, 2017), 10 pgs.

(Continued)

*Primary Examiner* — Brenda C Bernardi
(74) *Attorney, Agent, or Firm* — Schwegman Lundberg & Woessner, P.A.

(57) ABSTRACT

A system for authenticating a vehicle includes a processor subsystem; and memory comprising instructions, which when executed by the processor subsystem, cause the processor subsystem to perform the operations comprising: receiving, at a cloud service, vehicle location data describing a location of the vehicle at a first time; receiving attestation data from a witness device, the attestation data corresponding to the first time; producing a validation result by analyzing the vehicle location data and the attestation data to determine whether the location of the vehicle at the first time is consistent with the attestation data; and providing the validation result to a user device for presentation on the user device.

23 Claims, 10 Drawing Sheets

(51) Int. Cl.
*H04W 12/12* (2009.01)
*H04W 12/00* (2009.01)

(56) References Cited

U.S. PATENT DOCUMENTS

2016/0247388 A1     8/2016  Sogabe
2018/0359039 A1    12/2018  Daoura et al.
2019/0086221 A1*    3/2019  Thiyagarajan ..... G01C 21/3423

OTHER PUBLICATIONS

Zamir, Amir R, "Using location to see", Stanford University, 113 pgs.
"International Application Serial No. PCT US2019 062589, International Search Report dated Mar. 10, 2020", 3 pgs.
"International Application Serial No. PCT US2019 062589, Written Opinion dated Mar. 10, 2020", 6 pgs.

* cited by examiner

AUTHENTICATION BY NAVIGATION-CORRELATED SENSING

TECHNICAL FIELD

Embodiments described herein generally relate to authentication and security, and in particular, to using various sensor devices to authenticate and validate a vehicle to a potential user or rider.

BACKGROUND

Vehicles are increasingly computerized and equipped with sensors and other electronics. The electronics, processors, and other computerized components of a vehicle are used to provide location-based services, monitor engine controls, provide driver assistance systems, enable safety features, and support other functions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

When a person calls for a vehicle, such as for ride sharing or taxi service, the person may wish to have evidence that the vehicle is safe. While some existing technologies allow for vehicle tracking while the vehicle is en route to a pickup spot, use of positioning systems alone is not sufficient to provide a complete validation. For instance, the driver of the vehicle may have swapped out, the vehicle may have been tampered with before arriving at the pickup spot (e.g., global positioning system (GPS) unit may be swapped to another car or hacked directly), or the positioning information data may be spoofed or altered. Further, in the case of a valet service, rental car pick up, repair shop pick up, or other situations, it is next to impossible to determine whether the vehicle was tampered with before it arrives.

The present disclosure provides an architecture and related systems to monitor a vehicle to ensure safety and security. After a vehicle has been associated with a user in some way (e.g., as an owner, renter, assigned passenger, etc.), and while the vehicle is out of sight, various monitoring systems may be used to validate the vehicle's location and continued integrity over a period of time. Such methods may be used in concert with other existing methods to provide additional security or attestation.

Attestation is an act or process of certifying the authenticity of something. Vehicle attestation is a mechanism to certify or confirm that a vehicle under test is the one that the user expects. Vehicle attestation may be proved by infrastructure monitoring (e.g., cameras or other sensors on a building that observer the vehicle under test), vehicle monitoring (e.g., cameras, wireless radios, etc. in a secondary vehicle that pass by the vehicle under test), people (e.g., cameras or other devices on a person near the vehicle under test), or self-monitoring (e.g., cameras or other sensors or devices inside the vehicle under test).

Figure 1:
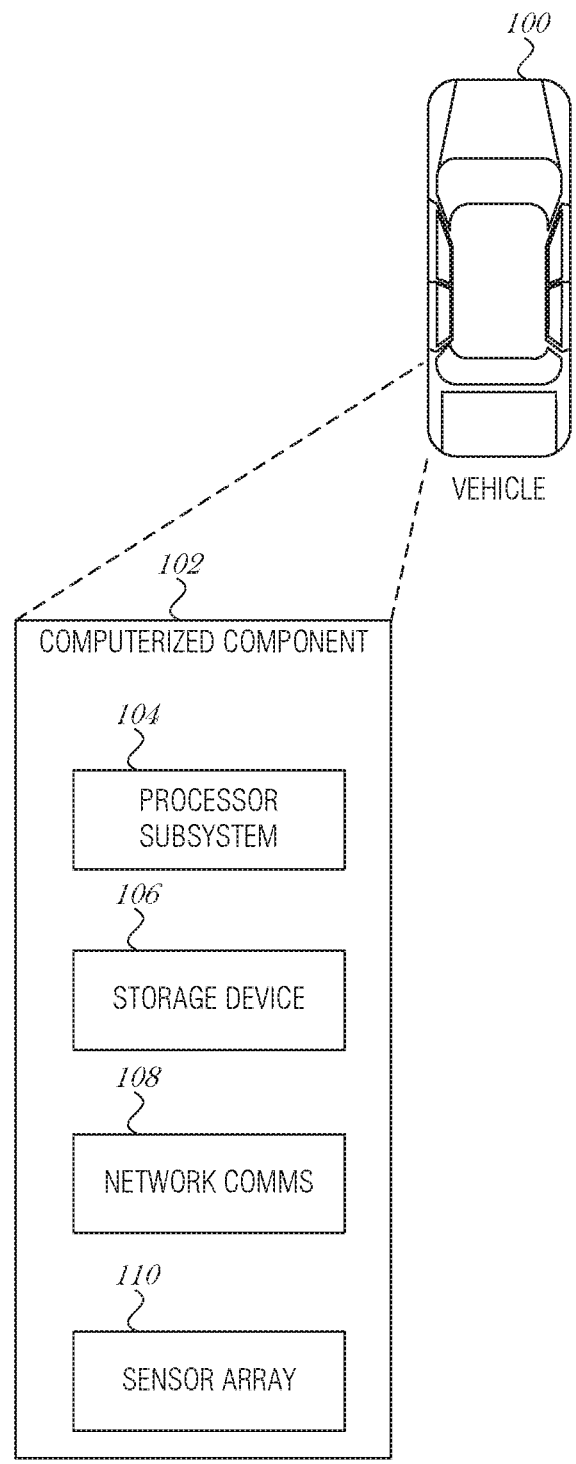
FIG. 1 is a schematic drawing illustrating a vehicle, according to an embodiment.

FIG. 1 is a schematic drawing illustrating a vehicle 100, according to an embodiment. FIG. 1 includes one or more computerized components 102 incorporated into the vehicle 100. The vehicle 100 may be of any type of vehicle, such as a commercial vehicle, a consumer vehicle, a recreation vehicle, a car, a truck, a motorcycle, airplane, or a boat. The vehicle 100 may be an autonomous or semi-autonomous vehicle. In general, the computerized component 102 includes a processor subsystem 104, and a storage device 106. The processor subsystem 104 may include one or more processors, each with one or more cores. Additionally, the processor subsystem 104 may be disposed on one or more physical devices. The processor subsystem 104 may include one or more specialized processors, such as a graphics processing unit (GPU), a digital signal processor (DSP), a field programmable gate array (FPGA), or a fixed function processor.

The storage device 106 includes one or more devices used to store data. A storage device 106 may include any non-transitory mechanism for storing information in a form readable by a machine (e.g., a computer). For example, a storage device 106 may include read-only memory (ROM), random-access memory (RAM), magnetic disk storage media, optical storage media, flash-memory devices, or other storage devices and media.

The computerized component 102 may be installed as an after-market component of the vehicle 100, or may be provided as a manufacturer option. As an after-market component, the computerized component 102 may plug into the existing infrastructure in the vehicle 100.

The computerized component 102 may support, enable, integrate, provide, or be used in one of many subsystems in a vehicle 100, including but not limited to engine control systems, navigation systems, driver assistance systems, safety systems, infotainment systems, and the like.

For instance, the computerized component 102 may support, enable, integrate, or provide a sensor array 110, which may include various forward, side, and rearward facing cameras, radar, LIDAR, ultrasonic, GPS, or other sensors.

In another aspect, the computerized component 102 may support, enable, or be integrated with various other sensors as part of the sensor array 110, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

In another aspect, the computerized component 102 may support, enable, or be integrated with an on-board diagnostics system to record vehicle operation and other aspects of the vehicle's performance, maintenance, or status. The on-board diagnostics system may determine various vehicle state data, such as whether the windshield wipers are activated, whether the driving lights are activated, whether a sunroof is open or closed, etc.

Components of the computerized component 102 may communicate using a network communication circuitry 108 to communicate over various networks, which may include local-area networks (LAN), wide-area networks (WAN), wireless networks (e.g., IEEE 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

Figure 2:
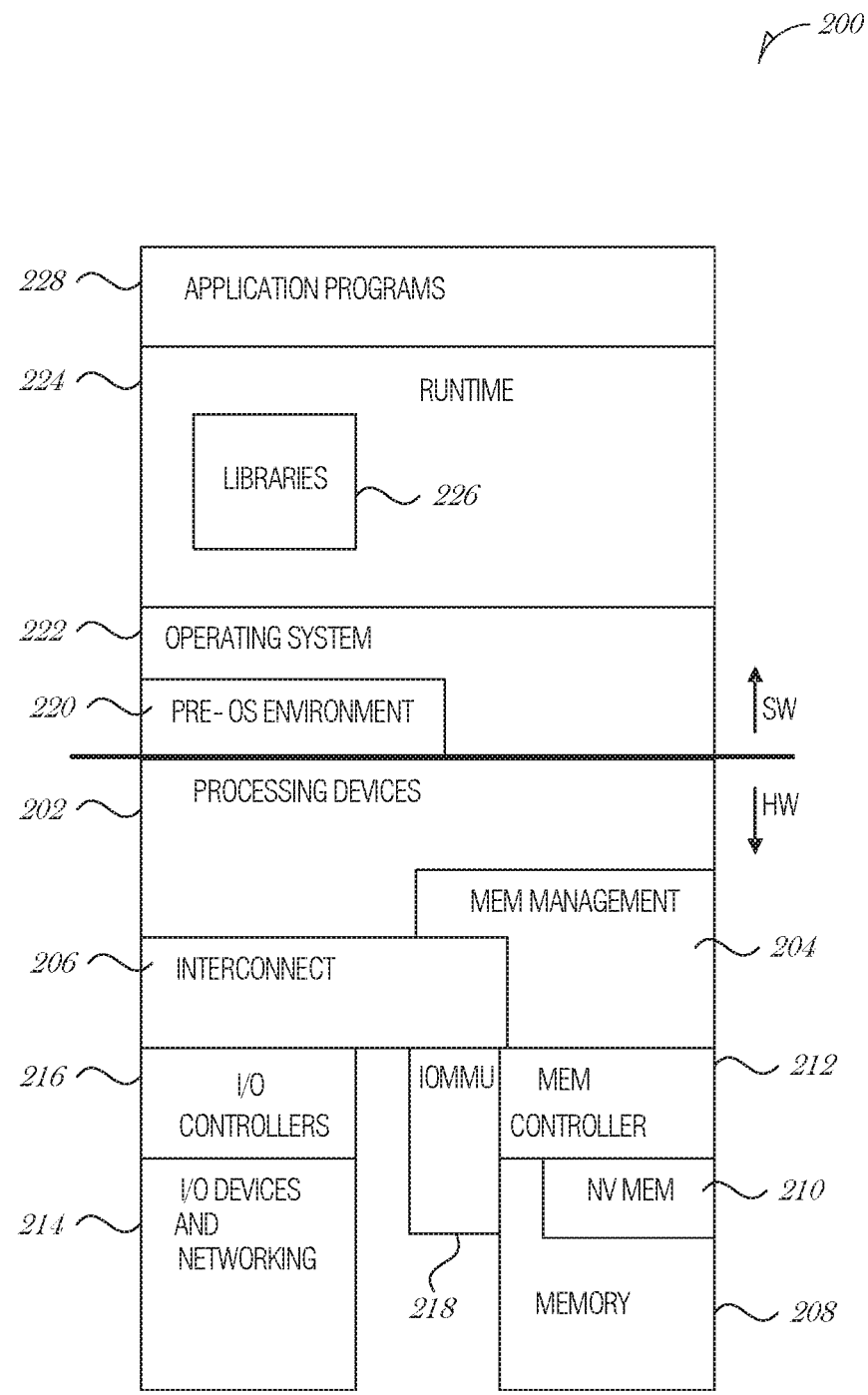
FIG. 2 is a diagram illustrating hardware and software architecture of a computerized component, such as the computerized component of FIG. 1, in which various interfaces between hardware components and software components are shown, according to an embodiment.

FIG. 2 is a diagram illustrating hardware and software architecture 200 of a computerized component, such as the computerized component 102 described above, in which various interfaces between hardware components and software components are shown, according to an embodiment. As indicated in FIG. 2 by "HW," hardware components are represented below the divider line, whereas software components (denoted by "SW") reside above the divider line. On the hardware side, processing devices 202 (which may include one or more microprocessors, digital signal processors, etc., each having one or more processor cores, are interfaced with memory management device 204 and system interconnect 206. Memory management device 204 provides mappings between virtual memory used by processes being executed, and the physical memory. Memory management device 204 may be an integral part of a central processing unit which also includes the processing devices 202.

Interconnect 206 includes a backplane such as memory, data, and control lines, as well as the interface with input/output devices, e.g., PCI, USB, etc. Memory 208 (e.g., dynamic random access memory—DRAM) and non-volatile memory 210 such as flash memory (e.g., electrically-erasable read-only memory—EEPROM, NAND Flash, NOR Flash, etc.) are interfaced with memory management device 204 and interconnect 206 via memory controller 212. This architecture 200 may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 214, which interface with interconnect 206 via corresponding I/O controllers 216.

In a related embodiment, input/output memory management unit (IOMMU) 218 supports secure direct memory access (DMA) by peripherals. IOMMU 218 may provide memory protection by meditating access to memory 208 from I/O device 214. IOMMU 218 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 220, which is executed at initial system start-up and is responsible for initiating the boot-up of the operating system. One traditional example of pre-OS environment 220 is a system basic input/output system (BIOS). In present-day systems, a unified extensible firmware interface (UEFI) may be implemented. Pre-OS environment 220, is responsible for initiating the launching of the operating system, but also provides an execution environment for embedded applications.

A portion of the pre-OS environment 220 is the Memory Reference Code (MRC). The MRC is responsible for initializing the memory 208. This is performed as part of a POST process. The MRC firmware saves memory training data to non-volatile memory 210 to improve boot times on subsequent boots. On subsequent boots, so long as no exception cases have occurred, the data from non-volatile memory 210 is re-used.

Operating system (OS) 222 provides one or more kernels that control the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 222 provides device drivers, and a variety of common services such as those that facilitate interfacing with peripherals and networking, that provide abstraction for application programs so that the applications do not need to be responsible for handling the details of such common operations. Operating system 222 additionally provides a graphical user interface (GUI) that facilitates interaction with the user via peripheral devices such as a monitor, keyboard, mouse, microphone, video camera, touchscreen, and the like.

Runtime system 224 implements portions of an execution model, including such operations as putting parameters onto the stack before a function call, the behavior of disk input/output (I/O), and parallel execution-related behaviors. Runtime system 224 may also perform support services such as type checking, debugging, or code generation and optimization.

Libraries 226 include collections of program functions that provide further abstraction for application programs. These include shared libraries, dynamic linked libraries (DLLs), for example. Libraries 226 may be integral to the operating system 222, runtime system 224, or may be added-on features, or even remotely-hosted. Libraries 226 define an application program interface (API) through which a variety of function calls may be made by application programs 228 to invoke the services provided by the operating system 222. Application programs 228 are those programs that perform useful tasks for users, beyond the tasks performed by lower-level system programs that coordinate the basic operability of the computing device itself. Application programs 228 may include in-dash infotainment systems (e.g., navigation, radio programming, vehicle diagnostics, social media, etc.), emergency services, vehicle concierge, and the like. Application programs 228 may also be used to control various sensors or other subsystems in a vehicle, such as camera views, LIDAR sensitivity, advanced driver-assistance systems (ADAS), etc.

Depending on the design of the computerized component, some aspects that are described in FIG. 2 may be omitted or combined with other aspects.

Figure 3:
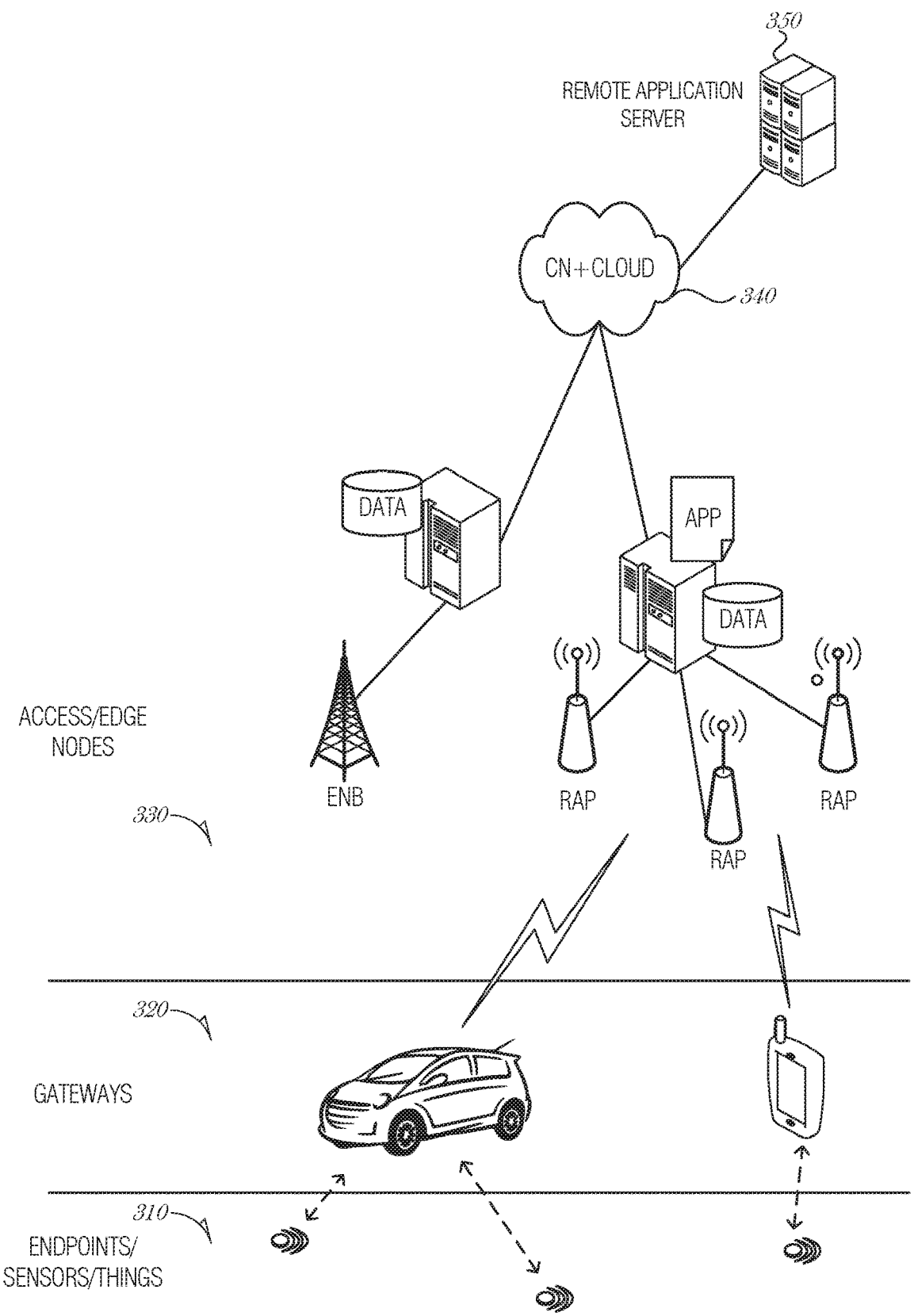
FIG. 3 illustrates devices and network entities in a multi-access communications environment.

FIG. 3 illustrates devices and network entities in a multi-access communications environment. FIG. 3 specifically illustrates the different layers of communication occurring within the environment, starting from endpoint sensors or things 310 (e.g., operating in an IoT network topology); increasing in sophistication to gateways (e.g., vehicles) or intermediate nodes 320, which facilitate the collection and processing of data from endpoints 310; increasing in processing and connectivity sophistication to access or edge nodes 330 (e.g., road-side units operating as edge computing nodes), such as may be embodied by base stations (eNbs), roadside access points (RAPs) or roadside units (RSUs), nodes, or servers; and increasing in connectivity and processing sophistication to a core network or cloud setting 340. Indeed, the processing at the core network or cloud setting 340 may be enhanced by network services as performed by a remote application server 350 or other cloud services.

As shown, in the scenario of FIG. 3, the endpoints 310 communicate various types of information to the gateways or intermediate nodes 320; however, due to the mobility of the gateways or intermediate nodes 320 (such as in a vehicle or mobile computing device) this results in multiple access points or types of access points being used for network access, multiple distinct services and servers being used for computing operations, multiple distinct applications and data being available for processing, and multiple distinct network operations being offered as the characteristics and capabilities of the available network services and network pathways change. In particular, the environment may involve aspects of Vehicle-to-Infrastructure (V2X), Vehicle-to-Vehicle (V2V) and Vehicle-to-Infrastructure (V2I) services from vehicle user equipment (UE) or human-operated portable UEs (e.g., mobile smartphones and computing devices), which introduces significant complexity for computing services and network usage.

Figure 4:
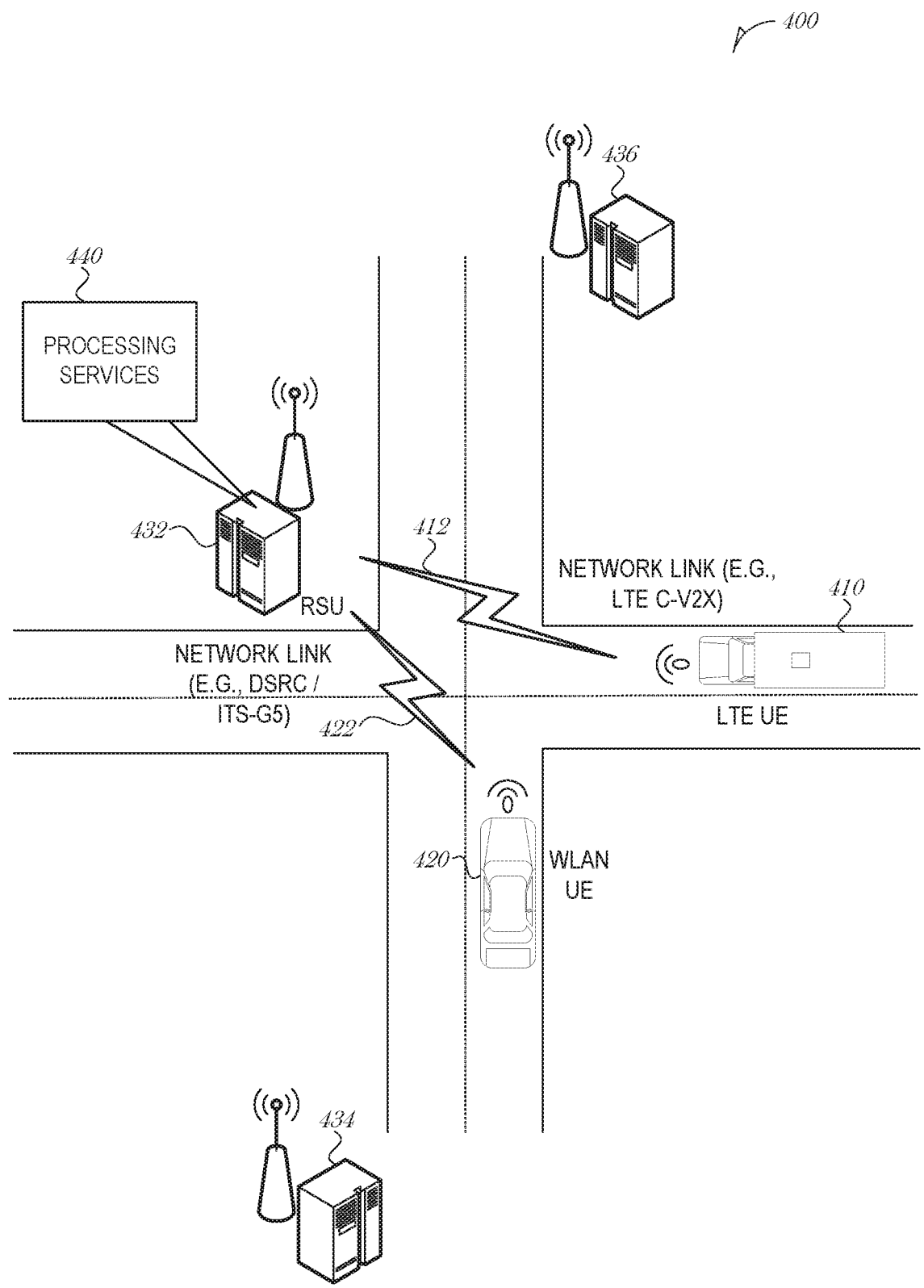
FIG. 4 illustrates an operative arrangement of network and vehicle user equipment, in which various embodiments may be practiced.

FIG. 4 illustrates an operative arrangement 400 of network and vehicle user equipment, in which various embodiments may be practiced. In arrangement 400, vehicle user equipment (vUE) 410, 420 may operate with a defined communication system (e.g., using a LTE C-V2X WWAN 412, or a SRC/ETSI ITS-G5 (WLAN) communication network 422, etc.). In embodiments, a Road Side Unit (RSU) 432 may provide processing services 440 by which the vUEs 410 and 420 may communicate with one another (or to other services), execute services individually and with each other, or access similar aspects of coordinated or device-specific edge computing services.

In embodiments, the processing services 440 may be provided by a multi-access edge computing (MEC) host (e.g., an ETSI MEC host), MEC platform, or other MEC entity implemented in or by hardware of the RSU 432. In this example, the RSU 432 may be a stationary RSU, such as an eNB-type RSU or other like infrastructure. In other embodiments, the RSU 432 may be a mobile RSU or a UE-type RSU, which may be implemented by a vehicle (e.g., a truck), pedestrian, or some other device with such capabilities. In these cases, mobility issues may be managed in order to ensure a proper radio coverage of the applicable services. For instance, mobility may be managed as the respective vUEs 410, 420 transition from, and to, operation at other RSUs, such as RSUs 434, 436, and other network nodes not shown.

Using the systems described in FIGS. 1-4, roadside infrastructure and other sensors that are near the road may be used to provide independent validation of a vehicle's location and continuity of the vehicle's location over time. In general, when a vehicle, which has been associated with a user, is out of sight, the vehicle may upload information about its location and status and roadside witness devices (devices that are able to observe or verify a vehicle's location) upload attestation data to validate the vehicle's location, path, status, or other information. A witness device is a device that provides attestation data. Example witness devices include, but are not limited to, roadside access points (RAP), base stations (e.g., eNB), Wi-Fi access points (AP), monitoring devices, personal cellular phones, etc. A witness device includes sensors to capture information about the vehicle and communication circuitry to communicate attestation data to a cloud service.

Several mechanisms to collect and report attestation data are described herein. It is understood that any data that may be used to verify or authenticate a vehicle's location, path, status, or other information may be used and that the examples and embodiments discussed herein are non-limiting. Further, although many examples discuss the concepts with a vehicle, it is understood that any ambulatory device is within the scope of this discussion including, but not limited to robots, drones, and autonomous vehicles.

Figure 5:
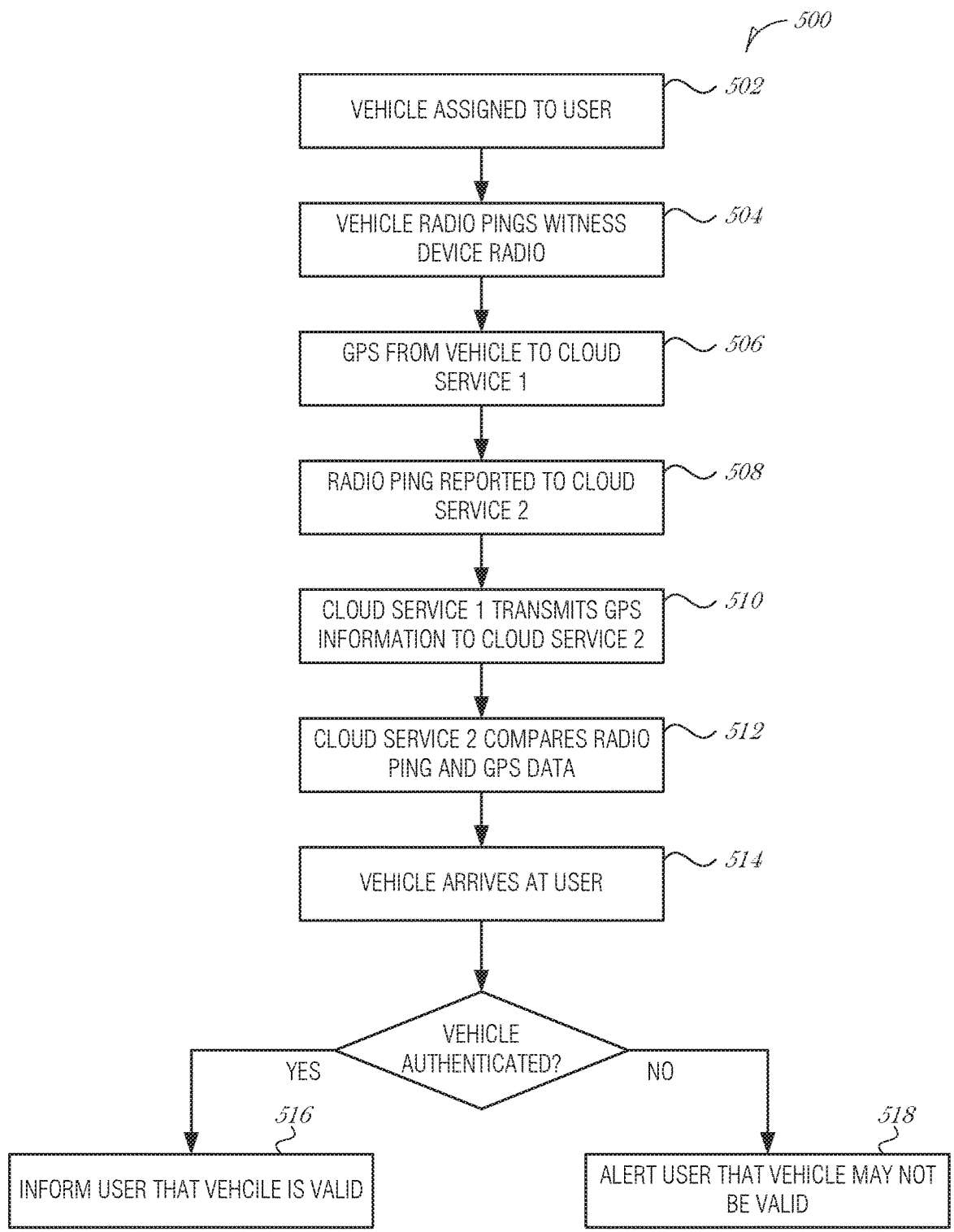
FIG. 5 illustrates a signaling flow using wireless connections, according to an embodiment.

FIG. 5 illustrates a signaling flow 500 using wireless connections, according to an embodiment. A vehicle assigned to a user (operation 502) may periodically or regularly establish wireless connections with witness devices, such as roadside access points (operation 504). The wireless connection may be minimal in nature and only be used to establish that the vehicle is within range of a wireless network. The connection may be referred to as a radio ping and may be conducted over Bluetooth, Wi-Fi, cellular, using radio frequency identification (RFID), or the like. The ping may include a vehicle identifier. The vehicle may upload to a first cloud service, its position as determined by an onboard sensor (e.g., GPS radio) at the time of the radio ping, along with its vehicle identifier (operation 506).

The witness device may upload information indicating that the vehicle pinged the witness device to a separate cloud service (operation 508). The information may include the vehicle identifier, a time of the ping, location, type of ping, etc. If the witness device is a mobile device (e.g., mobile phone, another vehicle, etc.), then it may upload its own location information when reporting the ping activity. If the witness device is a stationery device (e.g., an access point hardwired to a traffic light), then the location of the witness device may be already known and the witness device only needs to upload its identification (e.g., a globally unique identifier). Using separate cloud services provides additional security against hacking or other security threats. The first cloud service provides information about the radio ping and vehicle location information to the second cloud service (operation 510), which is then able to compare the data and determine whether there are any anomalies (operation 512).

After the vehicle arrives at the user (operation 514), the user is informed of whether the vehicle is valid (operation 516) or possibly invalid (operation 518) based on the evaluation performed in operation 512.

Figure 6:
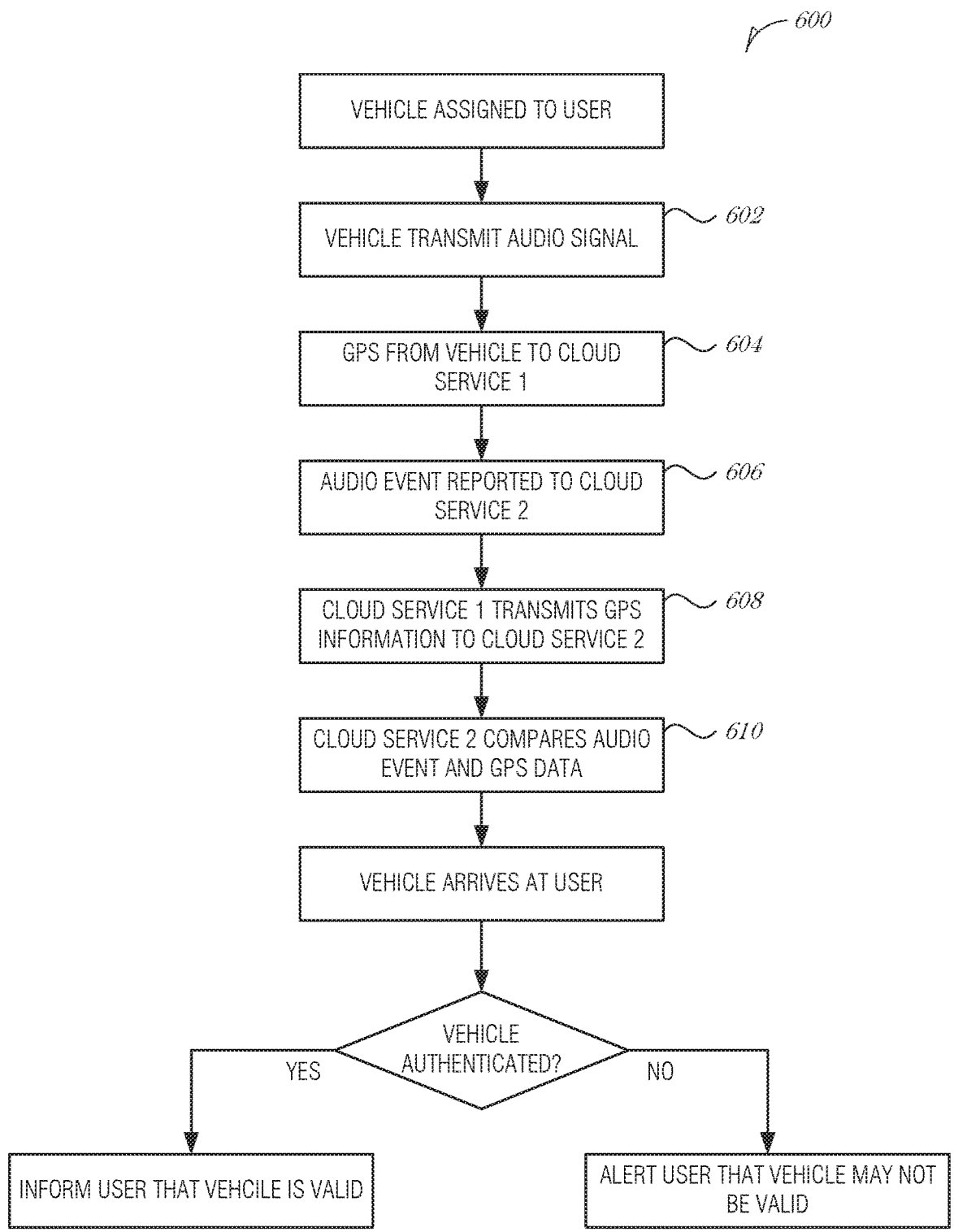
FIG. 6 illustrates a signaling flow using audio, according to an embodiment.

FIG. 6 illustrates a signaling flow 600 using audio, according to an embodiment. A vehicle may use an audio broadcast to cause a vibration that is sensed by a witness device (operation 602). The audio may cause a vibration that is sent through a road surface, for example, or through the air at a frequency that is imperceptible by humans. The vehicle may upload its location to a first cloud service when it broadcasts the audio signal (operation 604). The witness device uploads information to a second cloud service indicating that the vehicle broadcasted an audio signal (operation 606). The first cloud service transmits its vehicle location information to the second cloud service (operation 608), which then authenticates the vehicle's location (operation 610).

Figure 7:
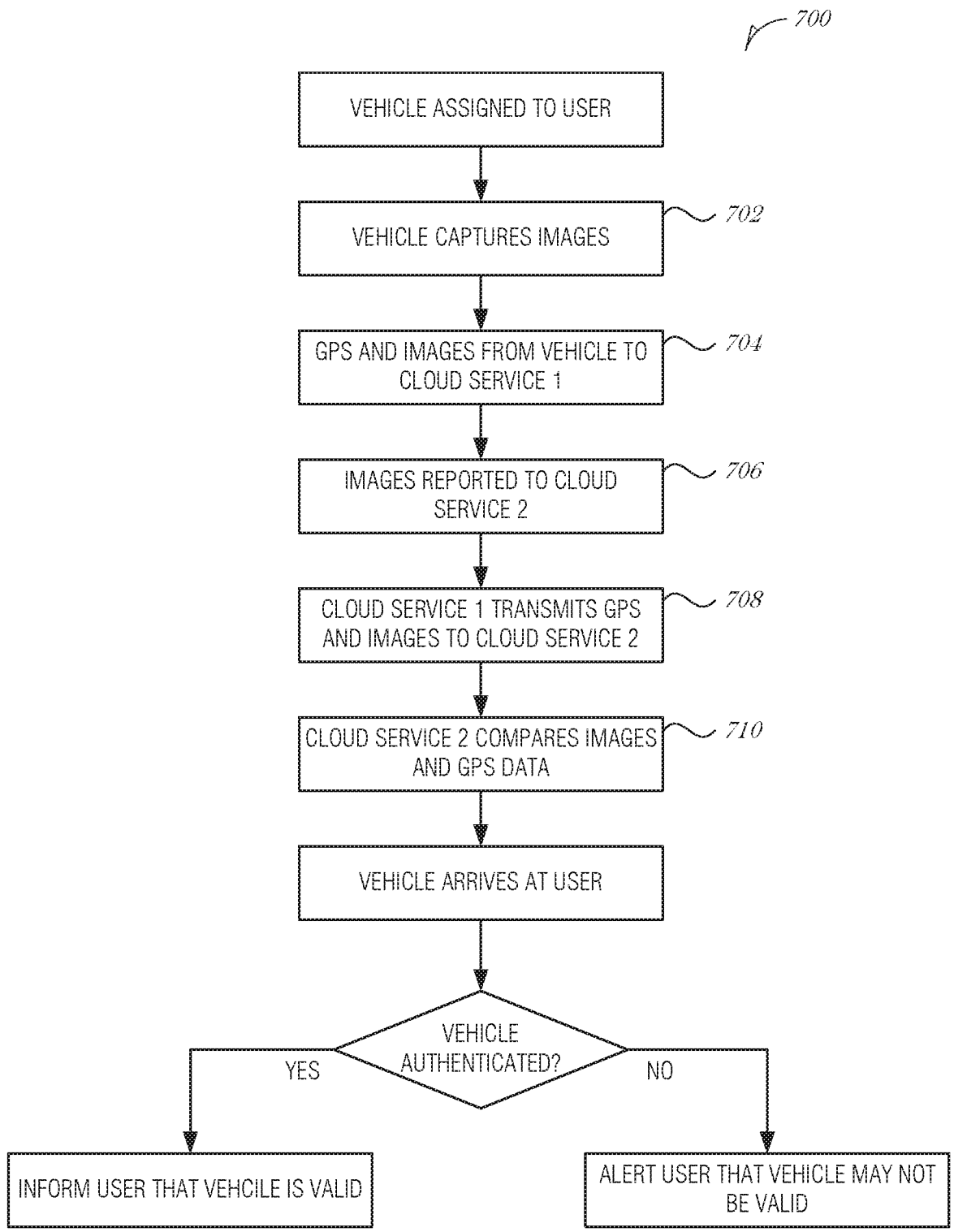
FIG. 7 illustrates a signaling flow using images, according to an embodiment.

FIG. 7 illustrates a signaling flow 700 using images, according to an embodiment. A vehicle may periodically capture images (operation 702) and upload its location and one or more images taken at or near the location to a first cloud service (operation 704). The vehicle may communicate with a witness device, which also takes images of the vehicle or the environment around the vehicle and uploads attestation images to a second cloud service (operation 706). The first cloud service transmits its vehicle location information and images to the second cloud service (operation 708), which then authenticates the vehicle's location using image analysis to compare the images captured by the vehicle with those captured by the witness device (operation 710). By combining location and vision, the second cloud service is able to localize a camera's viewpoint geo-spatially with landmarks. For each camera, the service is able to track the vehicle in the scene and place it spatially by recognizing surrounding landmarks, shadows to understand light direction, and other objects in the scene. Both dynamic objects with trajectories (e.g., vehicles, birds in flight, pedestrians, etc.) and static landmarks (e.g., traffic signs, road curbs, trees, etc.) may be tracked and used in image registration and analysis.

Figure 8:
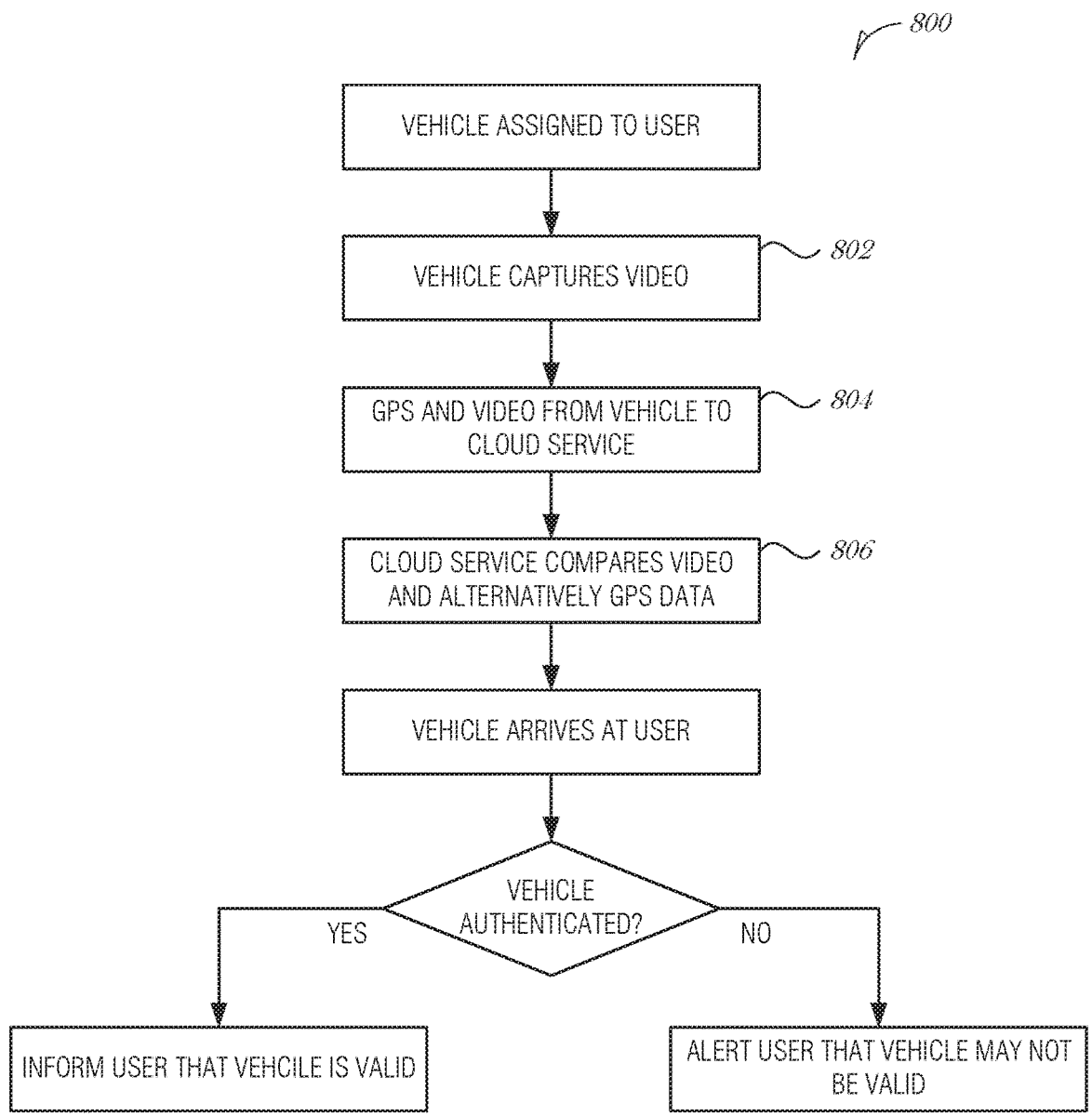
FIG. 8 illustrates a signaling flow using video, according to an embodiment.

FIG. 8 illustrates a signaling flow 800 using video, according to an embodiment. Using video content, a vehicle is able to determine spectral continuity. A high-framerate video is captured by a camera in the vehicle (operation 802), which is transmitted to a cloud service (operation 804). The cloud service is able to verify the continuity of the video and test the validity of the GPS data with the continuity of the video (operation 806).

A relatively small field of view may be used for the analysis to reduce computational overhead and network load. The cloud service is able to analyze the video for frame-to-frame continuity using a straightforward visual comparison algorithm. In this way, someone counterfeiting GPS data would not have access to continuous frames from the same vehicle. Additionally, the cloud service may analyze the video to extract and recognize landmarks, and correlate the landmarks with the GPS data as an added validity check.

In another example, a witness device, external from the vehicle, is configured with a high-frame rate camera to capture the vehicle's image in each frame to make sure that the vehicle has not detoured from the known route and is continuously being tracked and validated. If the vehicle is moving, each frame will have a slighting shifted view of the vehicle, depending of frame rate of camera and motion of the vehicle. The object recognition algorithm may review each frame, determine that the vehicle is in the scene, validate the pixel motion, and determine if vehicle is still in the scene. If multiple cameras are used, the cloud service may triangulate (or trilaterate) the position of the vehicle and the direction it is heading. In another example, the vehicle's camera may continuously check if it is on the appropriate route by continuously tracking landmarks along the way. If a landmark is not detected in a subsequent frame, then the vehicle may have detoured off of the valid route.

Validation data indicating that the vehicle is authentic may be presented to a user on a user device. Using this type of attestation and authentication, the vehicle's origin and "chain of title" may be validated. The user may view location data, image data, or other information that confirms the authentication.

The validation techniques described herein largely reduce or eliminate various threat vectors. For instance, using the radio pings, audio, or image comparison (illustrated in FIGS. 5-7), reduces or eliminates the ability of an attacker to hack the GPS unit in a vehicle to report misleading GPS data, or hack a witness device (e.g., infrastructure device) because of the use of two independent cloud services, or hack the vehicle data before it is uploaded to the cloud service. Additionally, using a continuous video stream analysis reduces or eliminates the threat of an attacker hacking the cloud service for the witness device. By using several methods together, the security may be heightened. Additionally, security may be further bolstered using tamper-proof physical modules, trusted execution environments, encrypted communications, server-side security, and other security mechanisms.

Further, while some types of attestation data are discussed herein, any type of sensor may be used to authenticate a vehicle or a vehicle's location. For instance, RFID, audio, magnetic, capacitance, chemical, or other sensors or signaling devices may be used to correlate a vehicle's location with a witness device.

Figure 9:
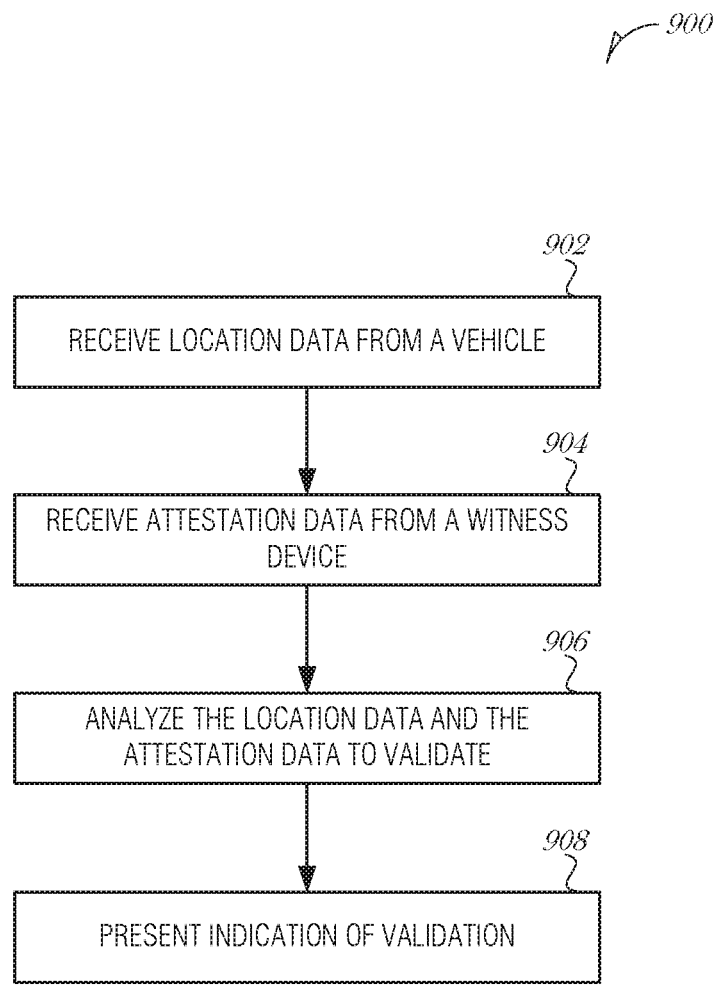
FIG. 9 is a flowchart illustrating a method for authenticating a vehicle, according to an embodiment.

FIG. 9 is a flowchart illustrating a method 900 for authenticating a vehicle, according to an embodiment. At 902, vehicle location data describing a location of the vehicle at a first time is received at a cloud service. In an embodiment, receiving the vehicle location data comprises receiving the vehicle location data from a separate cloud service.

At 904, attestation data from a witness device is received, where the attestation data corresponding to the first time. In an embodiment, the witness device comprises a roadside access point. In another embodiment, the witness device comprises a cellular phone. In another embodiment, the witness device comprises a base station.

At 906, the vehicle location data and the attestation data are analyzed to determine whether the location of the vehicle at the first time is consistent with the attestation data, to produce a validation result.

In an embodiment, the attestation data comprises an indication of a radio ping between the vehicle and the witness device. In a further embodiment, the radio ping is encrypted. In a further embodiment, the indication of the radio ping includes a time the radio ping occurred and a location of the radio ping. In a related embodiment, analyzing the vehicle location data and the attestation data includes comparing the vehicle location to the location of the radio ping to determine whether the locations are proximate.

In another embodiment, the attestation data comprises an indication of an audio event, the audio event produced by the vehicle, and the indication of the audio event including a time of the audio event. In a further embodiment, analyzing the vehicle location data and the attestation data includes comparing the vehicle location at a particular time to the time of the audio event to determine whether the times are in close temporal proximity.

In another embodiment, the attestation data comprises an image captured by the witness device and a time the image was captured by the witness device. In a further embodiment, analyzing the vehicle location data and the attestation data includes accessing image data captured by the vehicle proximate to the first time and comparing the image data captured by the vehicle to the image captured by the witness device to determine whether the images correspond to a similar location.

At 908, the validation result is provided to a user device for presentation on the user device. The user device may include various mobile devices, such as a laptop, cellular phone, mobile phone, wearable device, etc.

In another embodiment, video is used as attestation data and a method includes receiving, at a cloud service, vehicle location data describing a location of the vehicle at a first time and receiving, at the cloud service, video data captured by the vehicle and corresponding to the first time. The method may also include analyzing the video data to determine whether the video data is continuous and consistent, to produce a validation result and providing the validation result to a user device for presentation on the user device. In a further embodiment, the method of using video as attestation data may include analyzing the video data and the location of the vehicle to determine if the video data is authentic and modifying the validation result based on the analysis.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 10:
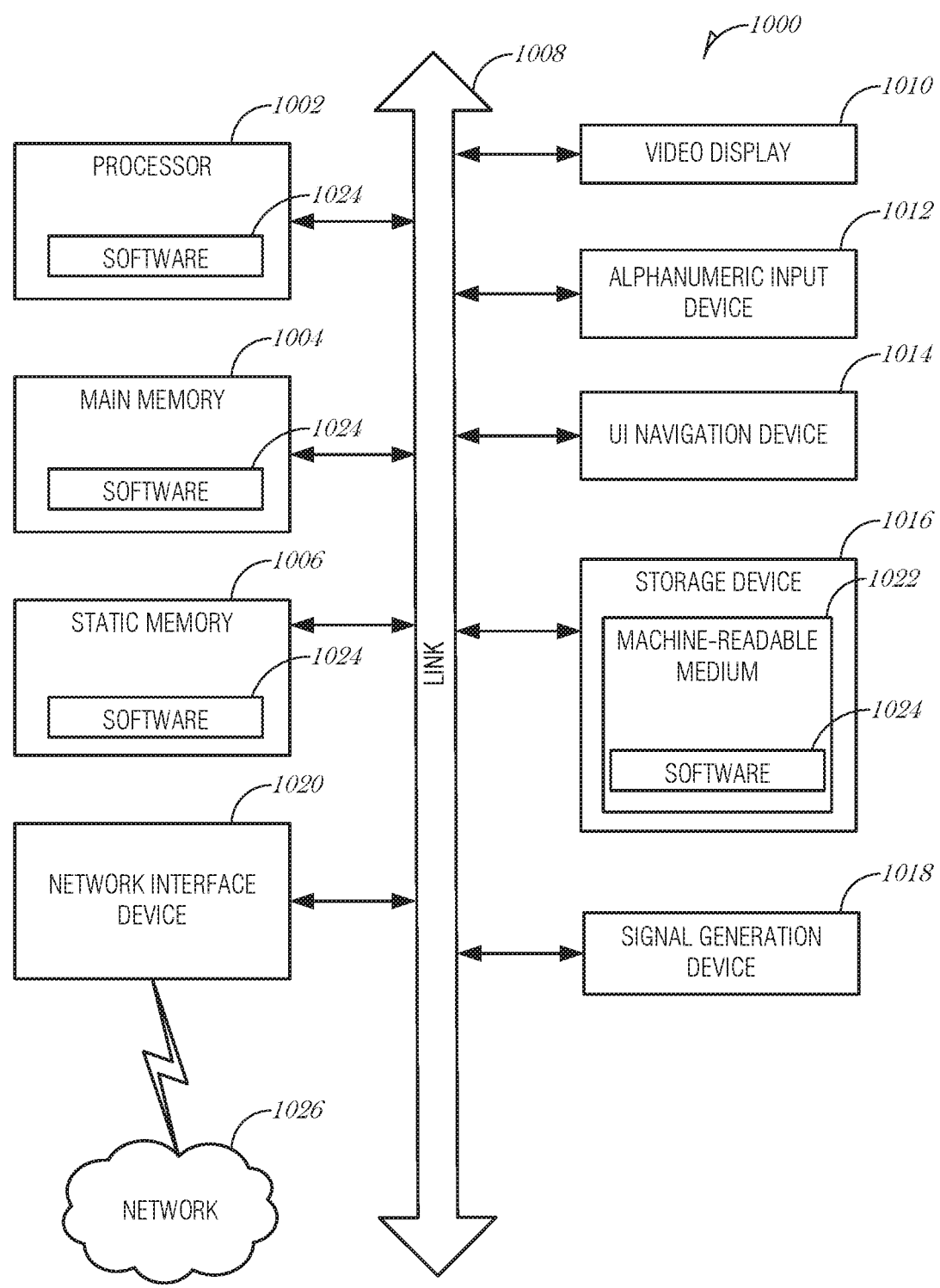
FIG. 10 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 10 is a block diagram illustrating a machine in the example form of a computer system 1000, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an infotainment system, a driver's assistance system, a safety system, an engine control system, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, gyrometer, magnetometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a system for authenticating a vehicle, the system comprising: a processor subsystem; and memory comprising instructions, which when executed by the processor subsystem, cause the processor subsystem to perform the operations comprising: receiving, at a cloud service, vehicle location data describing a location of the vehicle at a first Lime; receiving attestation data from a witness device, the attestation data corresponding to the first time; producing a validation result by analyzing the vehicle location data and the attestation data to determine whether the location of the vehicle at the first time is consistent with the attestation data; and providing the validation result to a user device for presentation on the user device.

In Example 2, the subject matter of Example 1 includes, wherein receiving the vehicle location data comprises receiving the vehicle location data from a separate cloud service.

In Example 3, the subject matter of Examples 1-2 includes, wherein the witness device comprises a roadside access point.

In Example 4, the subject matter of Examples 1-3 includes, wherein the witness device comprises a cellular phone.

In Example 5, the subject matter of Examples 1-4 includes, wherein the witness device comprises a base station.

In Example 6, the subject matter of Examples 1-5 includes, wherein the attestation data comprises an indication of a radio ping between the vehicle and the witness device.

In Example 7, the subject matter of Example 6 includes, wherein the radio ping is encrypted.

In Example 8, the subject matter of Examples 6-7 includes, wherein the indication of the radio ping includes a time the radio ping occurred and a location of the radio ping.

In Example 9, the subject matter of Examples 6-8 includes, wherein analyzing the vehicle location data and the attestation data comprises comparing the vehicle location to the location of the radio ping to determine whether the locations are proximate.

In Example 10, the subject matter of Examples 1-9 includes, wherein the attestation data comprises an indication of an audio event, the audio event produced by the vehicle, and the indication of the audio event including a time of the audio event.

In Example 11, the subject matter of Example 10 includes, wherein analyzing the vehicle location data and the attestation data comprises comparing the vehicle location at a particular time to the time of the audio event to determine whether the times are in close temporal proximity.

In Example 12, the subject matter of Examples 1-11 includes, wherein the attestation data comprises an image captured by the witness device and a time the image was captured by the witness device.

In Example 13, the subject matter of Example 12 includes, wherein analyzing the vehicle location data and the attestation data comprises: accessing image data captured by the vehicle proximate to the first time; and comparing the image data captured by the vehicle to the image captured by the witness device to determine whether the images correspond to a similar location.

Example 14 is a system for authenticating a vehicle, the system comprising: a processor subsystem; and memory comprising instructions, which when executed by the processor subsystem, cause the processor subsystem to perform the operations comprising: receiving, at a cloud service, vehicle location data describing a location of the vehicle at a first time; receiving, at the cloud service, video data captured by the vehicle and corresponding to the first time; analyzing the video data to determine whether the video data is continuous and consistent, to produce a validation result; and providing the validation result to a user device for presentation on the user device.

In Example 15, the subject matter of Example 14 includes, instructions to perform the operations comprising: analyzing the video data and the location of the vehicle to determine if the video data is authentic; and modifying the validation result based on the analysis.

Example 16 is a method for authenticating a vehicle, the method comprising: receiving, at a cloud service, vehicle location data describing a location of the vehicle at a first time; receiving attestation data from a witness device, the attestation data corresponding to the first time: producing a validation result by analyzing the vehicle location data and the attestation data to determine whether the location of the vehicle at the first time is consistent with the attestation data; and providing the validation result to a user device for presentation on the user device.

In Example 17, the subject matter of Example 16 includes, wherein receiving the vehicle location data comprises receiving the vehicle location data from a separate cloud service.

In Example 18, the subject matter of Examples 16-17 includes, wherein the witness device comprises a roadside access point.

In Example 19, the subject matter of Examples 16-18 includes, wherein the witness device comprises a cellular phone.

In Example 20, the subject matter of Examples 16-19 includes, wherein the witness device comprises a base station.

In Example 21, the subject matter of Examples 16-20 includes, wherein the attestation data comprises an indication of a radio ping between the vehicle and the witness device.

In Example 22, the subject matter of Example 21 includes, wherein the radio ping is encrypted.

In Example 23, the subject matter of Examples 21-22 includes, wherein the indication of the radio ping includes a time the radio ping occurred and a location of the radio ping.

In Example 24, the subject matter of Examples 21-23 includes, wherein analyzing the vehicle location data and the attestation data comprises comparing the vehicle location to the location of the radio ping to determine whether the locations are proximate.

In Example 25, the subject matter of Examples 16-24 includes, wherein the attestation data comprises an indication of an audio event, the audio event produced by the vehicle, and the indication of the audio event including a time of the audio event.

In Example 26, the subject matter of Example 25 includes, wherein analyzing the vehicle location data and the attestation data comprises comparing the vehicle location at a particular time to the time of the audio event to determine whether the times are in close temporal proximity.

In Example 27, the subject matter of Examples 16-26 includes, wherein the attestation data comprises an image captured by the witness device and a time the image was captured by the witness device.

In Example 28, the subject matter of Example 27 includes, wherein analyzing the vehicle location data and the attestation data comprises: accessing image data captured by the vehicle proximate to the first time; and comparing the image data captured by the vehicle to the image captured by the witness device to determine whether the images correspond to a similar location.

Example 29 is a method for authenticating a vehicle, the method comprising: receiving, at a cloud service, vehicle location data describing a location of the vehicle at a first time; receiving, at the cloud service, video data captured by the vehicle and corresponding to the first time; analyzing the video data to determine whether the video data is continuous and consistent, to produce a validation result; and providing the validation result to a user device for presentation on the user device.

In Example 30, the subject matter of Example 29 includes, analyzing the video data and the location of the vehicle to determine if the video data is authentic; and modifying the validation result based on the analysis.

Example 31 is at least one machine-readable medium including instructions, which when executed by a machine, cause the machine to perform operations of any of the methods of Examples 16-30.

Example 32 is an apparatus comprising means for performing any of the methods of Examples 16-30.

Example 33 is an apparatus for authenticating a vehicle, the apparatus comprising: means for receiving, at a cloud service, vehicle location data describing a location of the vehicle at a first time; means for receiving attestation data from a witness device, the attestation data corresponding to the first time; means for producing a validation result by analyzing the vehicle location data and the attestation data to determine whether the location of the vehicle at the first time is consistent with the attestation data: and means for providing the validation result to a user device for presentation on the user device.

In Example 34, the subject matter of Example 33 includes, wherein the means for receiving the vehicle location data comprise means for receiving the vehicle location data from a separate cloud service.

In Example 35, the subject matter of Examples 33-34 includes, wherein the witness device comprises a roadside access point.

In Example 36, the subject matter of Examples 33-35 includes, wherein the witness device comprises a cellular phone.

In Example 37, the subject matter of Examples 33-36 includes, wherein the witness device comprises a base station.

In Example 38, the subject matter of Examples 33-37 includes, wherein the attestation data comprises an indication of a radio ping between the vehicle and the witness device.

In Example 39, the subject matter of Example 38 includes, wherein the radio ping is encrypted.

In Example 40, the subject matter of Examples 38-39 includes, wherein the indication of the radio ping includes a time the radio ping occurred and a location of the radio ping.

In Example 41, the subject matter of Examples 38-40 includes, wherein the means for analyzing the vehicle location data and the attestation data comprise means for comparing the vehicle location to the location of the radio ping to determine whether the locations are proximate.

In Example 42, the subject matter of Examples 33-41 includes, wherein the attestation data comprises an indication of an audio event, the audio event produced by the vehicle, and the indication of the audio event including a time of the audio event.

In Example 43, the subject matter of Example 42 includes, wherein the means for analyzing the vehicle location data and the attestation data comprise means for comparing the vehicle location at a particular time to the time of the audio event to determine whether the times are in close temporal proximity.

In Example 44, the subject matter of Examples 33-43 includes, wherein the attestation data comprises an image captured by the witness device and a time the image was captured by the witness device.

In Example 45, the subject matter of Example 44 includes, wherein the means for analyzing the vehicle location data and the attestation data comprise: means for accessing image data captured by the vehicle proximate to the first time; and means for comparing the image data captured by the vehicle to the image captured by the witness device to determine whether the images correspond to a similar location.

Example 46 is an apparatus for authenticating a vehicle, the apparatus comprising: means for receiving, at a cloud service, vehicle location data describing a location of the vehicle at a first time; means for receiving, at the cloud service, video data captured by the vehicle and corresponding to the first time; means for analyzing the video data to determine whether the video data is continuous and consistent, to produce a validation result; and means for providing the validation result to a user device for presentation on the user device.

In Example 47, the subject matter of Example 46 includes, means for analyzing the video data and the location of the vehicle to determine if the video data is authentic; and means for modifying the validation result based on the analysis.

Example 48 is at least one machine-readable medium including instructions for authenticating a vehicle, the instructions when executed by a machine, cause the machine to perform the operations comprising: receiving, at a cloud service, vehicle location data describing a location of the vehicle at a first time; receiving attestation data from a witness device, the attestation data corresponding to the first time; producing a validation result by analyzing the vehicle location data and the attestation data to determine whether the location of the vehicle at the first time is consistent with the attestation data; and providing the validation result to a user device for presentation on the user device.

In Example 49, the subject matter of Example 48 includes, wherein receiving the vehicle location data comprises receiving the vehicle location data from a separate cloud service.

In Example 50, the subject matter of Examples 48-49 includes, wherein the witness device comprises a roadside access point.

In Example 51, the subject matter of Examples 48-50 includes, wherein the witness device comprises a cellular phone.

In Example 52, the subject matter of Examples 48-51 includes, wherein the witness device comprises a base station.

In Example 53, the subject matter of Examples 48-52 includes, wherein the attestation data comprises an indication of a radio ping between the vehicle and the witness device.

In Example 54, the subject matter of Example 53 includes, wherein the radio ping is encrypted.

In Example 55, the subject matter of Examples 53-54 includes, wherein the indication of the radio ping includes a time the radio ping occurred and a location of the radio ping.

In Example 56, the subject matter of Examples 53-55 includes, wherein analyzing the vehicle location data and the attestation data comprises comparing the vehicle location to the location of the radio ping to determine whether the locations are proximate.

In Example 57, the subject matter of Examples 48-56 includes, wherein the attestation data comprises an indication of an audio event, the audio event produced by the vehicle, and the indication of the audio event including a time of the audio event.

In Example 58, the subject matter of Example 57 includes, wherein analyzing the vehicle location data and the attestation data comprises comparing the vehicle location at a particular time to the time of the audio event to determine whether the times are in close temporal proximity.

In Example 59, the subject matter of Examples 48-58 includes, wherein the attestation data comprises an image captured by the witness device and a time the image was captured by the witness device.

In Example 60, the subject matter of Example 59 includes, wherein analyzing the vehicle location data and the attestation data comprises: accessing image data captured by the vehicle proximate to the first time; and comparing the image data captured by the vehicle to the image captured by the witness device to determine whether the images correspond to a similar location.

Example 61 is at least one machine-readable medium including instructions for authenticating a vehicle, the instructions when executed by a machine, cause the machine to perform the operations comprising: receiving, at a cloud service, vehicle location data describing a location of the vehicle at a first time; receiving, at the cloud service, video data captured by the vehicle and corresponding to the first time; analyzing the video data to determine whether the video data is continuous and consistent, to produce a validation result; and providing the validation result to a user device for presentation on the user device.

In Example 62, the subject matter of Example 61 includes, instructions for performing the operations comprising: analyzing the video data and the location of the vehicle to determine if the video data is authentic; and modifying the validation result based on the analysis.

Example 63 is at least one machine-readable medium including instructions that, when executed by processing circuitry, cause the processing circuitry to perform operations to implement of any of Examples 1-62.

Example 64 is an apparatus comprising means to implement of any of Examples 1-62.

Example 65 is a system to implement of any of Examples 1-62.

Example 66 is a method to implement of any of Examples 1-62.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for authenticating a vehicle, the system comprising:
    a processor subsystem; and
    memory comprising instructions, which when executed by the processor subsystem, cause the processor subsystem to perform the operations comprising:
        receiving, at a cloud service, vehicle location data describing a location of the vehicle at a first time;
        receiving attestation data from a witness device, the attestation data corresponding to the first time, wherein the witness device includes a roadside access point or a base station;
        producing a validation result by analyzing the vehicle location data and the attestation data to determine whether the location of the vehicle at the first time is consistent with the attestation data; and
        providing the validation result to a user device for presentation on the user device.

2. The system of claim 1, wherein receiving the vehicle location data comprises receiving the vehicle location data from a separate cloud service.

3. The system of claim 1, wherein the witness device comprises a cellular phone.

4. The system of claim 1, wherein the attestation data comprises an indication of a radio ping between the vehicle and the witness device.

5. The system of claim 4, wherein the radio ping is encrypted.

6. The system of claim 4, wherein the indication of the radio ping includes a time the radio ping occurred and a location of the radio ping.

7. The system of claim 4, wherein analyzing the vehicle location data and the attestation data comprises comparing the vehicle location to the location of the radio ping to determine whether the locations are proximate.

8. The system of claim 1, wherein the attestation data comprises an indication of an audio event, the audio event produced by the vehicle, and the indication of the audio event including a time of the audio event.

9. The system of claim 8, wherein analyzing the vehicle location data and the attestation data comprises comparing the vehicle location at a particular time to the time of the audio event to determine whether the times are in close temporal proximity.

10. The system of claim 1, wherein the attestation data comprises an image captured by the witness device and a time the image was captured by the witness device.

11. The system of claim 10, wherein analyzing the vehicle location data and the attestation data comprises:
    accessing image data captured by the vehicle proximate to the first time; and
    comparing the image data captured by the vehicle to the image captured by the witness device to determine whether the images correspond to a similar location.

12. A system for authenticating a vehicle, the system comprising:
    a processor subsystem; and
    memory comprising instructions, which when executed by the processor subsystem, cause the processor subsystem to perform the operations comprising:
        receiving, at a cloud service, vehicle location data describing a location of the vehicle at a first time;
        receiving, at the cloud service, video data captured by the vehicle and corresponding to the first time;
        analyzing the video data to determine whether the video data is continuous and consistent, to produce a validation result; and
        providing the validation result to a user device for presentation on the user device.

13. The system of claim 12, further comprising instructions to perform the operations comprising:
    analyzing the video data and the location of the vehicle to determine if the video data is authentic; and
    modifying the validation result based on the analysis.

14. A method for authenticating a vehicle, the method comprising:
- receiving, at a cloud service, vehicle location data describing a location of the vehicle at a first time;
- receiving attestation data from a witness device, the attestation data corresponding to the first time, wherein the witness device includes a roadside access point or a base station;
- producing a validation result by analyzing the vehicle location data and the attestation data to determine whether the location of the vehicle at the first time is consistent with the attestation data; and
- providing the validation result to a user device for presentation on the user device.

15. The method of claim 14, wherein the attestation data comprises an indication of a radio ping between the vehicle and the witness device.

16. The method of claim 15, wherein the radio ping is encrypted.

17. The method of claim 15, wherein the indication of the radio ping includes a time the radio ping occurred and a location of the radio ping.

18. The method of claim 15, wherein analyzing the vehicle location data and the attestation data comprises comparing the vehicle location to the location of the radio ping to determine whether the locations are proximate.

19. A method for authenticating a vehicle, the method comprising:
- receiving, at a cloud service, vehicle location data describing a location of the vehicle at a first time;
- receiving, at the cloud service, video data captured by the vehicle and corresponding to the first time;
- analyzing the video data to determine whether the video data is continuous and consistent, to produce a validation result; and
- providing the validation result to a user device for presentation on the user device.

20. The method of claim 19, further comprising:
- analyzing the video data and the location of the vehicle to determine if the video data is authentic; and
- modifying the validation result based on the analysis.

21. At least one non-transitory machine-readable medium including instructions for authenticating a vehicle, the instructions when executed by a machine, cause the machine to perform the operations comprising:
- receiving, at a cloud service, vehicle location data describing a location of the vehicle at a first time;
- receiving attestation data from a witness device, the attestation data corresponding to the first time, wherein the witness device includes a roadside access point or a base station;
- producing a validation result by analyzing the vehicle location data and the attestation data to determine whether the location of the vehicle at the first time is consistent with the attestation data; and
- providing the validation result to a user device for presentation on the user device.

22. The at least one non-transitory machine-readable medium of claim 21, wherein the attestation data comprises an image captured by the witness device and a time the image was captured by the witness device.

23. The at least one non-transitory machine-readable medium of claim 22, wherein analyzing the vehicle location data and the attestation data comprises:
- accessing image data captured by the vehicle proximate to the first time; and
- comparing the image data captured by the vehicle to the image captured by the witness device to determine whether the images correspond to a similar location.

\* \* \* \* \*